(12) United States Patent
Woleben

(10) Patent No.: US 8,897,322 B1
(45) Date of Patent: Nov. 25, 2014

(54) ENHANCING VIDEO QUALITY FOR BROADCAST VIDEO SERVICES

(75) Inventor: Samuel M. Woleben, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1480 days.

(21) Appl. No.: 11/858,645

(22) Filed: Sep. 20, 2007

(51) Int. Cl.
*H04H 20/28* (2008.01)
*H04L 12/16* (2006.01)
*H04M 3/42* (2006.01)
*H04N 7/16* (2011.01)

(52) U.S. Cl.
USPC .......... 370/487; 370/265; 455/414.1; 725/62; 725/86

(58) Field of Classification Search
USPC ............. 370/335, 487, 265, 394; 375/240.27, 375/240.16, 240.01; 348/448, 425.4; 382/236; 725/62, 86; 455/414.1
See application file for complete search history.

(56) References Cited

U.S. PATENT DOCUMENTS

| | | | | |
|---|---|---|---|---|
| 6,025,888 | A * | 2/2000 | Pauls | 375/240.27 |
| 6,501,736 | B1 * | 12/2002 | Smolik et al. | 370/252 |
| 7,106,907 | B2 * | 9/2006 | Lin et al. | 382/236 |
| 7,773,556 | B2 * | 8/2010 | Jung et al. | 370/328 |
| 2004/0076332 | A1 * | 4/2004 | Lin et al. | 382/236 |
| 2005/0070256 | A1 * | 3/2005 | Hu | 455/414.1 |
| 2005/0118946 | A1 * | 6/2005 | Colban et al. | 455/3.06 |
| 2006/0015919 | A1 * | 1/2006 | Karppinen et al. | 725/116 |
| 2006/0056453 | A1 * | 3/2006 | Lindgren et al. | 370/468 |
| 2006/0093031 | A1 * | 5/2006 | Van Der Schaar et al. | 375/240.01 |
| 2006/0256867 | A1 * | 11/2006 | Turaga et al. | 375/240.16 |
| 2007/0127423 | A1 * | 6/2007 | Ho | 370/338 |
| 2007/0177579 | A1 * | 8/2007 | Diethorn et al. | 370/352 |
| 2007/0218835 | A1 * | 9/2007 | Hindelang et al. | 455/8 |
| 2008/0253335 | A1 * | 10/2008 | Bosch et al. | 370/335 |
| 2010/0033622 | A1 * | 2/2010 | Bellers et al. | 348/448 |
| 2010/0194977 | A1 * | 8/2010 | Sloo et al. | 348/425.4 |

FOREIGN PATENT DOCUMENTS

WO  WO 2004014083 A1 *  2/2004  ............... H04N 7/26

* cited by examiner

*Primary Examiner* — Hoang-Chuong Vu

(57) ABSTRACT

A method, system, and medium are provided for delivering broadcast video content at varying levels of video quality. In particular, a source video stream is provided that is divided into two or more video substreams such that the video substreams include offset frames from the source video stream. The video substreams are modulated onto one or more air interface channels. Mobile devices may be configured to access only one of the video substreams to present video content at a lower frame rate or to access multiple video substreams to present video content at a higher frame rate.

13 Claims, 4 Drawing Sheets

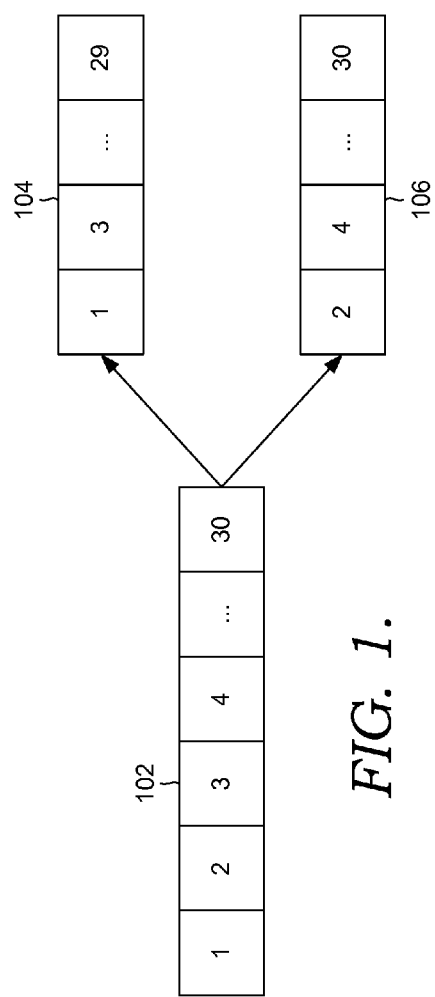
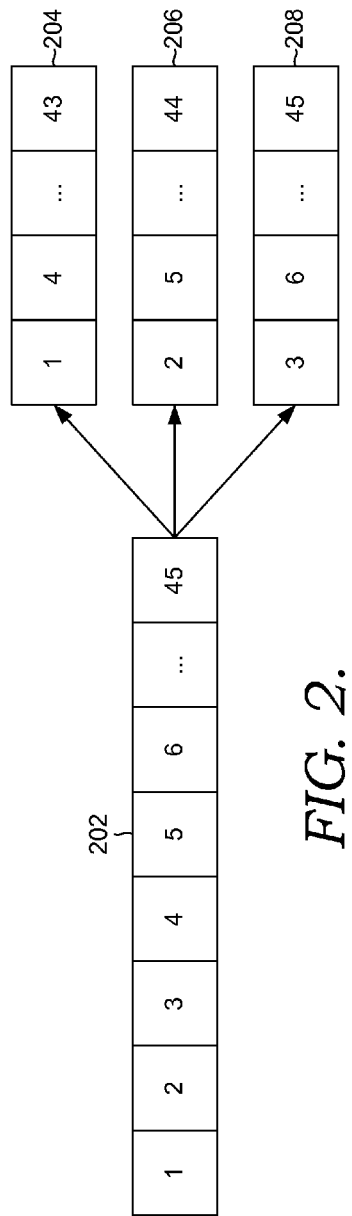
FIG. 1.
FIG. 2.

ENHANCING VIDEO QUALITY FOR BROADCAST VIDEO SERVICES

BACKGROUND

The capabilities of both mobile devices, such as cell phones, and the wireless networks that serve such mobile devices continue to grow exponentially. One particular area of service that customers have increasingly begun to demand is the ability to access and watch video content on their mobile devices. In response, wireless service providers (e.g., wireless telecommunication service providers) have employed high-speed wireless data networks to deliver video content to users' mobile devices. Traditionally, such video content services have been unicast, in which video content is delivered to a single mobile device in response to a request for the video content from that mobile device. While unicast transmission of video content is an effective approach when a limited number of users are accessing video content, unicast transmission is inefficient when multiple users are accessing the same video content at the same time as it unnecessarily consumes network resources. For instance, in some cases, users may wish to view television, sporting events, or other "live" video content.

Due at least in part to these limitations of unicast video services, wireless service providers have begun to provide broadcast video services over their high-speed wireless data networks. To provide broadcast video services, wireless service providers dedicate a portion of an air interface channel to broadcast video content. Users who want to access the broadcast video content may cause their mobile devices to tune to the portion of the air interface channel to access the broadcast video content. Accordingly, multiple users may simultaneously access the same video content. However, there are currently a number of limitations to broadcast video services including limited video quality and limitations related to the abilities of legacy mobile devices. As a result, all users may be limited to the same broadcast video quality despite the capabilities of their mobile devices and their desire to view video content at a higher video quality.

SUMMARY

The present invention is defined by the claims below. This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention provide systems, methods, and computer-readable media for, among other things, splitting a source video stream into at least two video substreams having offset frames from the source video stream and placing the video substreams onto one or more air interface channels. Embodiments of the present invention have several practical applications in the technical arts including, but not limited to, allowing video content service providers to provide different video services having varying video quality. In particular, a base service may be provided in which users' mobile devices may be configured to access a single video substream to present video content at a lower frame rate. Additionally, a premium service may be provided in which users' mobile devices may be configured to access and combine multiple video substreams to present video content at a higher frame rate.

Accordingly, in one aspect, an embodiment of the invention is directed to one or more computer-readable media embodying computer-useable instructions for performing a method. The method includes providing a video stream at a given frame rate. The method also includes splitting the video stream into two or more video substreams containing offset frames from the video stream. The method further includes modulating the two or more video substreams onto one or more air interface channels.

In another aspect of the invention, an embodiment is directed to one or more computer-readable media embodying computer-useable instructions for performing a method. The method includes providing a first video substream and a second video substream. The first video substream and the second video substream are derived from a source video stream of a given frame rate such that the first video substream and the second video substream contain offset frames from the source video stream. The method further includes modulating the first video substream onto a first air interface channel and the second video substream onto a second air interface channel.

A further embodiment of the invention is directed to a system including a broadcast server, a radio network controller, and a base transceiver station. The broadcast server provides video content associated with a source video stream. The radio network controller receives the video content from the broadcast server and places a first video substream and a second video substream onto one or more air interface channels. The first video substream and the second video substream include offset frames associated with the source video stream. The base transceiver station transmits one or more signals comprising the one or more air interface channels.

BRIEF DESCRIPTION OF THE DRAWINGS

Illustrative embodiments of the present invention are described in detail below with reference to the attached drawing figures, which are incorporated by reference herein and wherein:

FIG. 1 is a block diagram illustrating a source video stream being divided into two video substreams having offset frames from the source video stream in accordance with an embodiment of the present invention;

FIG. 2 is a block diagram illustrating a source video stream being divided into three video substreams having offset frames from the source video stream in accordance with an embodiment of the present invention;

DETAILED DESCRIPTION

Figure 3:
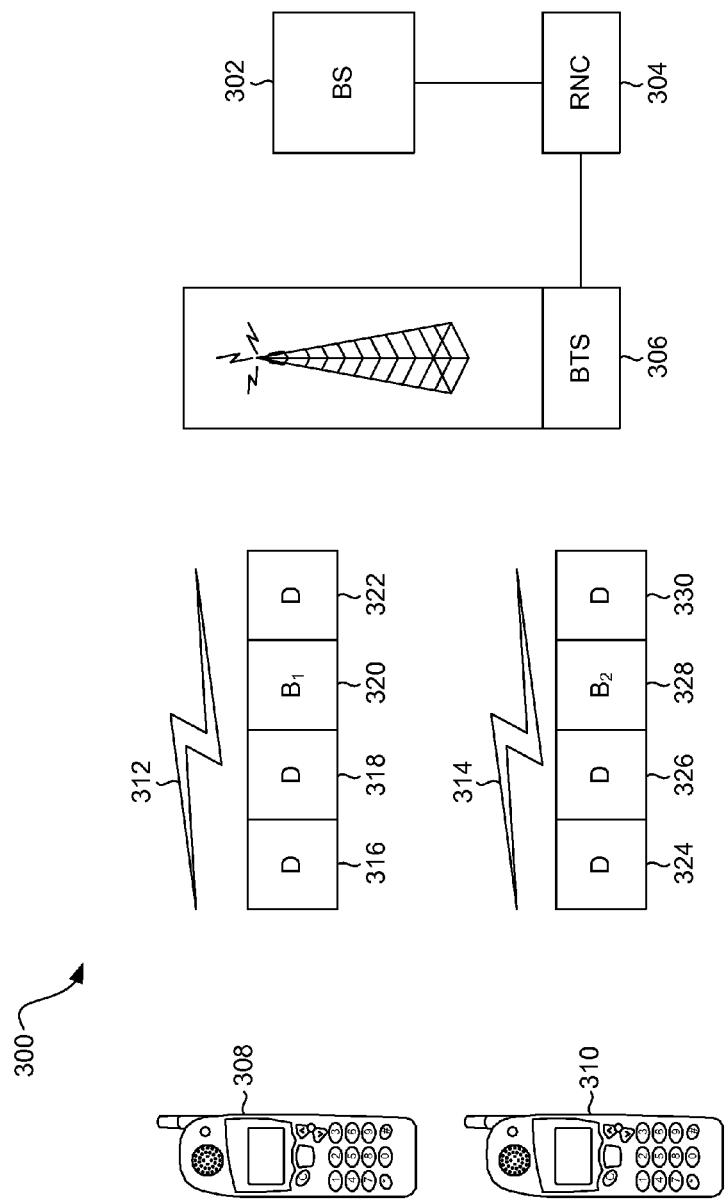
FIG. 3 is a block diagram of an exemplary system architecture suitable for use in implementing an embodiment of the present invention.

As discussed previously, the popularity of and demand for video content services delivered to mobile devices from high-speed wireless data networks, such as those provided by wireless telecommunication providers, is growing. Additionally, broadcast video services via such high-speed wireless data networks has become an attractive alternative to unicast service. Broadcast video services via high-speed wireless data networks are provided by placing a video stream on a portion of an air interface channel. Multiple users may simultaneously access the video stream by causing their mobile devices to be tuned to that portion of the air interface channel.

In current technology, broadcast services are limited to placing a video stream on a portion of a single air interface channel. Accordingly, all users accessing the broadcast services are currently limited to certain video quality parameters of the broadcast content. One such video quality parameter is the rate at which the frames of the video content are displayed to create the video stream (i.e., the frame rate). Typically, the frame rate for a video stream is expressed in frames per second (fps). Currently, many broadcast video services provide video streams at a frame rate of 15 fps.

Embodiments of the present invention permit, among other things, broadcast video service providers to offer at least two types of broadcast video services with varying video quality: a basic broadcast video service at a lower frame rate; and a premium broadcast video service at a higher frame rate. In embodiments, a video source is provided at a given frame rate. The video source is treated such that offset frames are scheduled onto either different portions of an air interface channel or different air interface channels. There may be two or more video substreams. For instance, in the case of two video substreams, the video source is treated such that every other frame is scheduled on one air interface channel and the other frames are scheduled either on a different portion of that air interface channel or on a different air interface channel. In other words, two video substreams are broadcast having offset frames from the video source. Users subscribing to a basic broadcast video service may access one of the video substreams to view the video content at a reduced frame rate (i.e., half the full frame rate), while users subscribing to a premium broadcast video service may access both video substreams to view the video content at the full frame rate. In embodiments, audio may be associated with the base video substream such that it may be accessed by all users.

Referring to FIG. 1, by way of example only and not limitation, suppose, for instance, that a video source 102 is provided at a frame rate of 30 fps. In an embodiment, the 30 fps video source would be split into two video substreams 104 and 106 having offset frames, such that each video substream has a frame rate of 15 fps. Accordingly, for a given second, the first video substream 104 includes frames 1, 3, 5, 7, 9, 11, 13, 15, 17, 19, 21, 23, 25, 27, and 29; while the second video substream 106 includes frames 2, 4, 6, 8, 10, 12, 14, 16, 18, 20, 22, 24, 26, 28, and 30. Customers having a basic broadcast service would be able to access one of the substreams and view the video content at 15 fps. Customers having a premium broadcast service would be able to access both substreams, which are combined on the customers' mobile devices, to provide the video content at 30 fps.

As another illustrative example, FIG. 2 depicts a video stream 202 being divided into three video substreams 204, 206, 208. The video stream 204 in the present example is provided at a frame rate of 45 fps. The frames from the video stream are divided such that each video substream 204, 206, 208 contains every third frame offset from the other two substreams. Accordingly, each video substream 204, 206, 208 is provided at a frame rate of 15 fps. For a given second: the first video substream 204 includes frames 1, 4, 7, 10, 13, 16, 19, 22, 25, 28, 31, 34, 37, 40, and 43; the second video substream 206 includes frames 2, 5, 8, 11, 14, 17, 20, 23, 26, 29, 32, 35, 38, 41, and 44; and the third video substream 208 includes frames 3, 6, 9, 12, 15, 18, 21, 24, 27, 30, 33, 36, 39, 42, and 45. Each of the video substreams 204, 206, and 208 may be placed on different portions of an air interface channel and/or on multiple air interface channels. As such, three levels of service could be provided: a first service accessing a single video substream at 15 fps; a second service accessing two video substreams at 30 fps; and a third service accessing all three video substreams at the full 45 fps frame rate.

Generally, legacy mobile devices are not capable of accessing and combining multiple video substreams broadcast over one or more air interface channels. Accordingly, legacy mobile devices would not be able to receive the premium broadcast service at the full frame rate (e.g., 30 fps). However, the legacy mobile devices can receive the basic broadcast service by accessing one of the video substreams at the lower frame rate (e.g., at the traditional 15 fps). Mobile devices in accordance with further embodiments of the present invention, however, are configured to combine the video substreams to provide the video content at the full frame rate (e.g., 30 fps), and as such can receive the premium broadcast service. Nonetheless, customers having mobile devices with such capabilities may wish to receive the basic broadcast service (e.g., at a lower fee), in which case the customers' mobile devices would only be permitted to access one of the video substreams. Accordingly, embodiments of the present invention provide an approach in which both legacy mobile devices and mobile devices with further capabilities may access broadcast video services. In particular, embodiments allow legacy mobile devices to continue to access broadcast video services at a lower frame rate (e.g., at the traditional 15 fps), while allowing mobile devices with further capabilities to access broadcast video services at a higher frame rate (e.g., 30 fps) if desired.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

BTS Base Transceiver Station
CDMA Code Division Multiple Access
EVDO Evolution Data Optimized
FPS Frames per second
GSM Global System for Mobile communications
TDMA Time Division Multiple Access As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Referring now to FIG. 3, a block diagram is shown of an exemplary system 300 in which exemplary embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

As shown in FIG. 3, the system 300 may include, among other components not shown, a broadcast server 302, a radio network controller 304, a base transceiver station 306, and mobile devices 308 and 310. The system 300 depicts an embodiment in which two offset video broadcast substreams from a source video stream are placed on two separate air interface channels. As will be described in further detail below, mobile devices may be configured to access one or both air interface channels to provide the video content at either a reduced or full frame rate.

The broadcast server 302 generally serves as a source of broadcast video content and may be connected to multiple types of sources of television, media, and/or other video content. In some cases, broadcast video content may be stored locally at the broadcast server 302 or an associated storage component. In other cases, the broadcast server 302 may receive video content feeds from television service providers or other sources.

The broadcast server 302 supplies the video content to the radio network controller 304. In some embodiments of the invention, the broadcast server 302 supplies a single video stream at a given frame rate. For instance, the broadcast server 302 may supply video content to the radio network controller 304 at a frame rate of 30 fps. In other embodiments of the invention, the broadcast server 302 supplies two video substreams for a given video content. In such embodiments, each video substream includes offset frames for the video content. For instance, for a 30 fps video content source and for a given second, the first video substream may include frames 1, 3, 5, 7, 9, 11, 13, 15, 17, 19, 21, 23, 25, 27, and 29, while the second video substream may include frames 2, 4, 6, 8, 10, 12, 14, 16, 18, 20, 22, 24, 26, 28, and 30. Accordingly, each video substream for such a 30 fps video content source is provided at a frame rate of 15 fps. In some cases, the broadcast server 302 may receive video content as a single video stream and split the source video stream into two substreams. In other cases, the broadcast server 302 may receive the video content as the two separate substreams.

The radio network controller 304 is generally responsible for controlling the base transceiver station 306 and managing the air interface channels. In embodiments, the radio network controller 304 is configured to receive video content from the broadcast server 302 and place video broadcast streams on air interface channels. In embodiments in which the broadcast server 302 provides a single video stream at a given frame rate (e.g., 30 fps), the radio network controller 304 splits the video stream into two substreams having offset frames. In embodiments in which the broadcast server 302 provides two video substreams for a given broadcast video content, the radio network controller 304 is not required to perform such splitting functionality.

In the present embodiment, the radio network controller 304 places the two video substreams for a given broadcast video content on two separate air interface channels 312, 314. For instance, in the example in which the source video content is provided at a 30 fps frame rate and the two substreams have a 15 fps frame rate, the first air interface channel 312 may include the first substream, including for any given second, frames 1, 3, 5, 7, 9, 11, 13, 15, 17, 19, 21, 23, 25, 27, and 29. Additionally, the second air interface channel 314 may include the second substream, including for any given second, frames 2, 4, 6, 8, 10, 12, 14, 16, 18, 20, 22, 24, 26, 28, and 30.

In the illustrated embodiment of FIG. 3, each air interface 312, 314 channel is divided into a number of times slots with the broadcast video content being placed at one of the time slots. For instance, the first air interface channel 312 is divided into four time slots 316, 318, 320, 322. Data for the first video substream is placed at the third time slot 320, while the first 316, second 318, and fourth 322 time slots include other data transmissions (e.g., voice calls, etc.). Similarly, the second air interface channel 314 is divided into four time slots 324, 326, 328, and 330. Data for the second video substream is placed at the third time slot 328, while the first 324, second 326, and fourth 330 time slots include other data transmissions. One skilled in the art will recognize that the description of the first and second air interface channels 312, 314 is provided for illustrative purposes only and that other approaches for placing broadcast video content on air interface channels may be employed within the scope of embodiments of the present invention.

The mobile devices 308, 310 may each be any type of device capable of communicating wirelessly. By way of example and not limitation, the mobile devices 308, 310 may be each be a cell phone, a pager, a personal data assistant (PDA), or a laptop computer. To provide wireless service to mobile devices 308, 310, the system 300 includes a BTS 306, which provides a wireless coverage area. The BTS 306 may communicate over a wireless air interface with one or more mobile devices, such as the mobile devices, 308, 310, located in the wireless coverage area. The communication between the BTS 306 and the mobile devices 308, 310 may occur in any digital format, such as CDMA, TDMA, GSM, 3G, or 802.11x.

By scheduling offset frames from a given video stream onto two separate air interface channels 312, 314, embodiments allow the mobile devices 308, 310 to access the video content at either a reduced frame rate (e.g., 15 fps) via a single video substream or the full frame rate (e.g., 30 fps) via both video substreams. For instance, suppose that the first mobile device 308 is a legacy device that is capable of accessing data transmissions from only a single air interface channel at a time. The first mobile device 308 would be capable of accessing one of the video substreams via one of the air interface channels 312, 314, and, as such, would provide the video content at the reduced frame rate (e.g., 15 fps). Suppose further that the second mobile device 310 is a device capable of receiving and combining data transmissions from multiple air interface channels (e.g., in accordance with EVDO Rev. B standards). The second mobile device 310 would be capable of accessing both video substreams via the air interface channels 312, 314 and combining the video substreams to provide the video content at the full frame rate (e.g., 30 fps). Accordingly, the present embodiment allows legacy mobile devices or subscribers to a base broadcast service to access broadcast vide content at a reduced frame rate (e.g., 15 fps) while also allowing other mobile devices (e.g., EVDO Rev. B enabled devices) to access broadcast video content at a higher frame rate (e.g., 30 fps).

Figure 4:
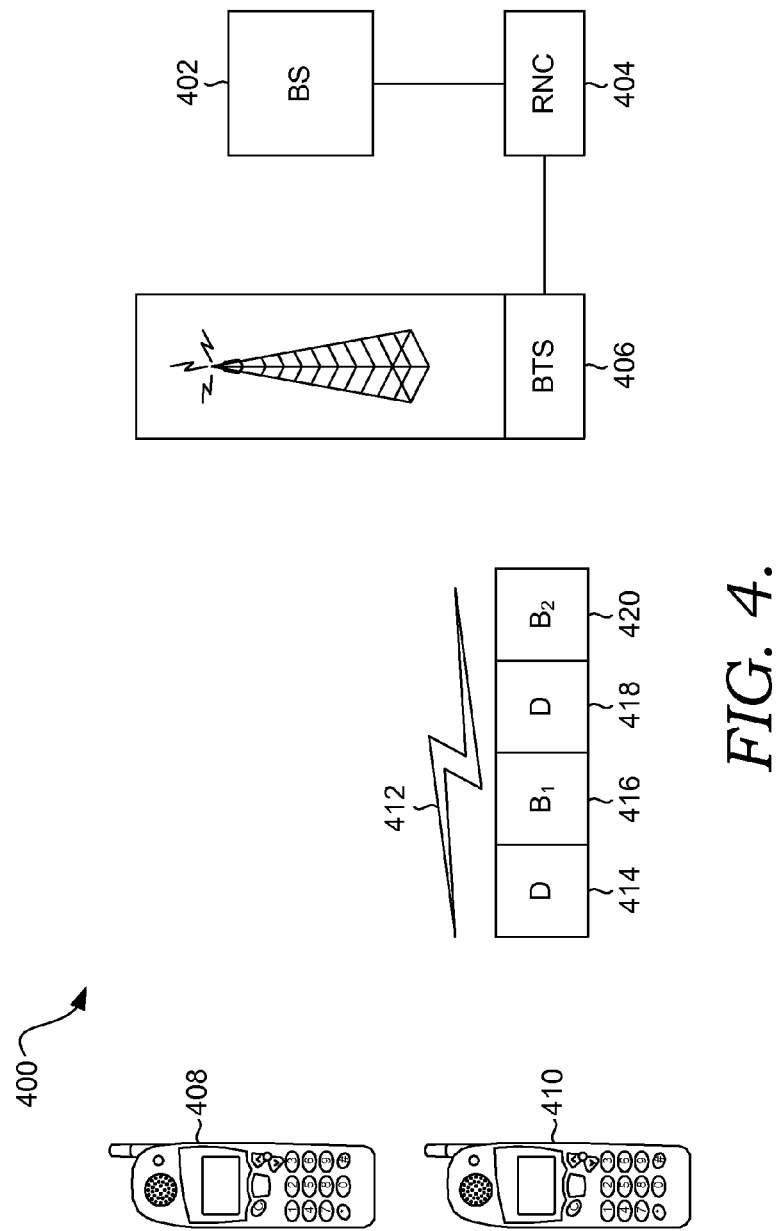
FIG. 4 is a block diagram of an exemplary system architecture suitable for use in implementing another embodiment of the present invention.

Turning to FIG. 4, a block diagram is provided showing a system 400 for providing base and premium broadcast video services in accordance with another embodiment of the present invention. In the embodiment illustrated in FIG. 4, two video substreams containing offset frames from a given video content source are placed on a single air interface channel as opposed to being placed on two separate air interface channels (as in the embodiment illustrated in FIG. 3). Similar to the system 300 of FIG. 3, the system 400 includes a broadcast server 402, which provides video content (either as a single video stream or divided into two video substreams) to a radio network controller 404. In the event the radio network controller 404 receives a single video stream, the radio network controller 404 divides the original video stream into two video substreams. As discussed previously, the two video substreams contain offset frames from the source video stream. For instance, the source video stream may be provided at a 30 fps frame rate such that each video substream has a frame rate of 15 fps.

The radio network controller 404 places the video substreams onto separate portions of a single air interface channel 412 for transmission by the base transceiver station 406. In the illustrated embodiment of FIG. 4, the air interface channel 412 is divided into four time slots 414, 416, 418, and 420. Data from the first video substream is placed at the second time slot 416, while data from the second video substream is placed at the fourth time slot 420. Additionally, the first 414 and third 418 time slots include other data transmissions (e.g., voice calls, etc.). One skilled in the art will recognize that the description of the air interface channel 412 is provided for illustrative purposes only and that other approaches for placing broadcast video content on an air interface channel may be employed within the scope of embodiments of the present invention.

By dividing a video stream into two substreams and placing the substreams onto different portions of the air interface channel 412, embodiments allow the mobile devices 408, 410 to access the video content at either a reduced frame rate (e.g., 15 fps) via a single video substream or the full frame rate (e.g., 30 fps) via both video substreams. For instance, suppose that the first mobile device 408 is a legacy device that is capable of accessing data transmissions from only a single portion of an air interface channel at a time. The first mobile device 408 would be capable of accessing one of the video substreams on the air interface channels 412 (e.g., at time slot 416), and, as such, would provide the video content at the reduced frame rate (e.g., 15 fps). The second mobile device 410, however, may be capable of receiving and combining data transmissions from different portions of the air interface channel 412. The second mobile device 410 then would be capable of accessing both video substreams and combining the video substreams to provide the video content at the full frame rate (e.g., 30 fps). Accordingly, similar to the embodiment described with reference to FIG. 3, the present embodiment allows mobile devices to access broadcast video content at a reduced frame rate (e.g., 15 fps) while simultaneously allowing other mobiles devices to access the broadcast video content at a full frame rate (e.g., 30 fps).

Although FIG. 3 and FIG. 4 illustrate embodiments of the invention in which a source video stream is divided into two video substreams, it should be understood that a video stream may be divided into more than two video substreams in accordance with further embodiments of the invention.

Figure 5:
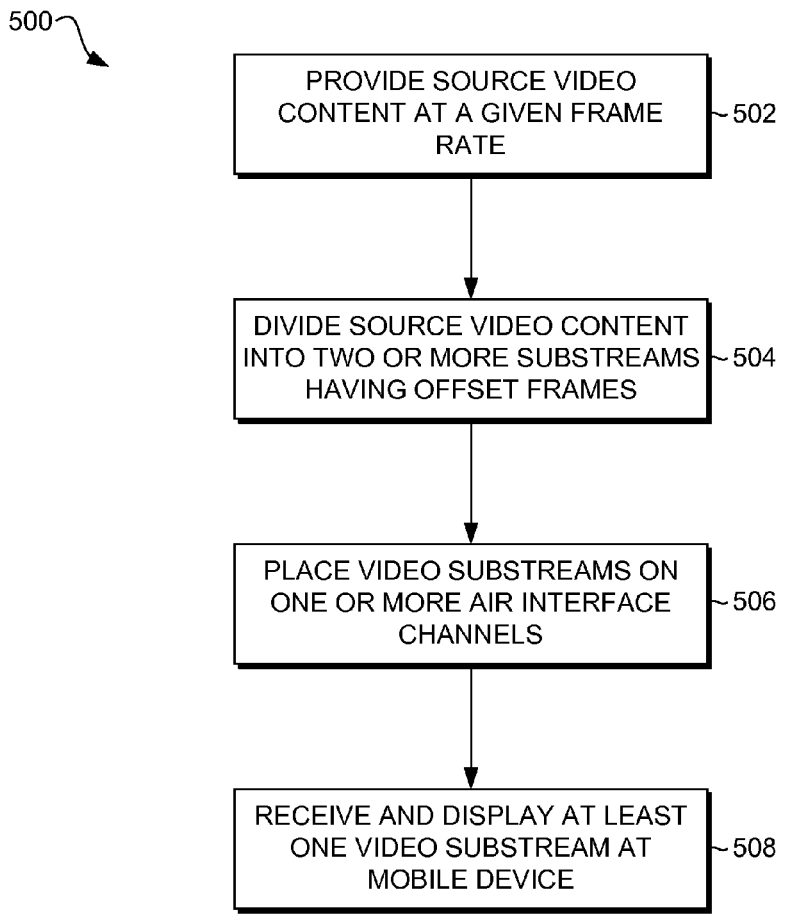
FIG. 5 is a flow diagram showing a method for providing basic and premium video broadcast services having different frame rates in accordance with an embodiment of the present invention.

Referring now to FIG. 5, a flow diagram is provided illustrating a method 500 for providing two or more broadcast video services with different video quality in accordance with an embodiment of the present invention. Initially, as shown at block 502, source video content is provided. The source video content may comprise a video stream at a given frame rate. For instance, the source video content may comprise a video stream at frame rate of 30 fps.

The video content is divided into two or more video substreams having offset frames from the source video stream, as shown at block 504. Accordingly, each video substream is provided at a fraction (e.g., half) of the frame rate of the original video stream. For instance, in the illustrative example in which the source video content is provided at a 30 fps frame rate and is divided into two video substream, each video substream would have a 15 fps frame rate. As discussed with reference to FIGS. 3 and 4, the source video content may be divided into substreams by one or more components, such as a broadcast server, a radio network controller, or other component. In some cases, the provider of the source video content, such as a television service provider, may provide the video content as multiple video substreams having offset frames. Any and all such variations are contemplated to be within the scope of embodiments of the present invention.

As shown at block 506, the video substreams are modulated onto one or more air interface channels. As discussed previously, in some embodiments, the video substreams are placed on two or more separate air interface channels. In other embodiments, the video substreams are placed at different portions of a single air interface channel.

A mobile device receives and displays at least one of the video substreams at block 508. In the case that the mobile device is a legacy device that does not support the functionality of accessing and combining two or more broadcast video streams from either a single air interface channel or two or more air interface channels, the mobile device will access and display only one of the video substreams. The video content is displayed on the legacy device at the reduced frame rate (e.g., 15 fps.). In the case that the mobile device supports the functionality of accessing and combining two or more broadcast video streams from either a single air interface channel or two or more air interface channels, the mobile device may access and combine the video substreams to display the video content at the full frame rate (e.g., 30 fps). In some cases, a user may be required to subscribe to a premium video broadcast service to access multiple video substreams and view the content at the full frame rate. Accordingly, if the user chooses subscribe to only a basic service (at the reduced frame rate), the user's mobile device may be allowed to access only one of the substreams despite the mobile device's capabilities.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media storing computer-useable instructions that, when used by one or more computing devices, cause the one or more computing devices to perform a method, the method comprising:
   providing a video stream at a given frame rate;
   splitting the video stream into two or more video substreams containing offset frames from the video stream;
   modulating the two or more video substreams onto one or more air interface channels;
   when a first mobile device is configured to combine the two or more video substreams, wherein the first mobile device is capable of accessing and combining multiple video substreams:
   (1) allowing the first mobile device to access a first video substream of the two or more video substreams based on subscription to a basic broadcast video service, wherein video content associated with the first video substream is presented on a display associated with the first mobile device at a lower frame rate; and
   (2) allowing the first mobile device to access both the offset frames of the first video substream and the offset frames of a second video substream of the two or more video substreams based on subscription to a premium broadcast video service, wherein the first mobile device combines the offset frames of the first video substream and the offset frames of the second video substream to present video content associated with the first and second video substreams on the display associated with the first mobile device at a higher frame rate; and
   when a second mobile device is not configured to combine the two or more video substreams, wherein the second mobile device is not capable of accessing and combining multiple video substreams:
   (1) allowing the second mobile device to access the first video substream based on subscription to a basic broadcast video service, wherein video content associated with the first video substream is presented on a display associated with the second mobile device at a lower frame rate.

2. The one or more computer-readable media of claim 1, wherein splitting the video stream comprises splitting the video stream into the first video substream and the second video substream, wherein the first video substream includes every other frame from the video stream and the second video substream includes remaining frames from the video stream.

3. The one or more computer-readable media of claim 2, wherein the given frame rate of the video stream is 30 frames per second and the first video substream and the second video substream each have a frame rate of 15 frames per second.

4. The one or more computer-readable media of claim 2, wherein modulating the two or more video substreams onto one or more air interface channels comprises modulating the first video substream onto a first air interface channel and modulating the second video substream onto a second air interface channel.

5. The one or more computer-readable media of claim 2, wherein modulating the two or more video substreams onto one or more air interface channels comprises modulating the first video substream onto a first portion of a given air interface channel and modulating the second video substream onto a second portion of the given air interface channel.

6. The one or more computer-readable media of claim 5, wherein the first portion and second portion comprise time slots of the given air interface channel.

7. One or more non-transitory computer-readable media storing computer-useable instructions that, when used by one or more computing devices, cause the one or more computing devices to perform a method, the method comprising:
   providing a first video substream and a second video substream, wherein the first video substream and the second video substream are derived from a source video stream of a given frame rate, and wherein the first video substream and the second video substream contain offset frames from the source video stream;
   modulating the first video substream onto a first air interface channel and the second video substream onto a second air interface channel;
   when a first mobile device is configured to combine the first video substream and the second video substream, wherein the first mobile device is capable of accessing and combining multiple video substreams from the first air interface channel and the second air interface channel:
   (1) allowing the first mobile device to access the first video substream based on subscription to a basic broadcast video service, wherein video content associated with the first video substream is presented on a display associated with the first mobile device at a lower frame rate; and
   (2) allowing the first mobile device to access both the offset frames of the first video substream and the offset frames of the second video substream based on subscription to a premium broadcast video service, wherein the first mobile device combines the offset frames of the first video substream and the offset frames of the second video substream to present video content associated with the first and second video substreams on the display associated with the first mobile device at a higher frame rate; and
   when a second mobile device is not configured to combine the first video substream and the second video substream, wherein the second mobile device is not capable of accessing and combining multiple video substreams in the first air interface and the second air interface:
   (1) allowing the second mobile device to access the first video substream based on subscription to a basic broadcast video service, wherein video content associated with the first video substream is presented on a display associated with the second mobile device at a lower frame rate.

8. A system comprising:
   a broadcast server providing video content associated with a source video stream;
   a radio network controller for receiving the video content from the broadcast server and placing a first video substream and a second video substream onto one or more air interface channels, wherein the first video substream and the second video substream include offset frames associated with the source video stream;
   a base transceiver station for transmitting one or more signals comprising the one or more air interface channels, the base transceiver station broadcasting the one or more signals to a plurality of mobile devices including a first mobile device and a second mobile device:
   when the first mobile device is configured to combine the first video substream and the second video substream, wherein the first mobile device is capable of accessing and combining multiple video sub streams:
   (1) the first mobile device accessing the first video substream based on a basic broadcast video service subscription, wherein video content associated with the first video substream is presented on a display associated with the first mobile device at a lower frame rate, (2) the first mobile device accessing both the first and second video substreams based on a premium broadcast video service subscription and combining the first and second video substreams to present video content associated with the first and second video substreams on the display associated with the first mobile device at a higher frame rate; and when the second mobile device is not configured to combine the first video substream and the second video substream, wherein the second mobile device is not capable of accessing and combining multiple video substreams:

(1) allowing the second mobile device to access the first video substream based on subscription to a basic broadcast video service, wherein video content associated with the first video substream is presented on a display associated with the second mobile device at a lower frame rate.

9. The system of claim 8, wherein the video content comprises the source video stream, and wherein the radio network controller splits the source video stream into the first and second video substreams.

10. The system of claim 8, wherein the video content comprises the first and second substreams.

11. The system of claim 8, wherein the radio network controller places the first video substream onto a first air interface channel and places the second video substream onto a second air interface channel.

12. The system of claim 8, wherein the radio network controller places the first video substream onto a first portion of an air interface channel and places the second video substream onto a second portion of an air interface channel.

13. The system of claim 8, wherein the source video stream is provided at a frame rate of 30 frames per second, and wherein the first video substream and the second video substream are each provided at a frame rate of 15 frames per second.

* * * * *